US007859251B2

(12) United States Patent
Biester et al.

(10) Patent No.: US 7,859,251 B2
(45) Date of Patent: Dec. 28, 2010

(54) APPARATUS DETECTING RELATIVE BODY MOVEMENT

(75) Inventors: Klaus Biester, Wienhausen (DE); Peter Kunow, Berlin (DE)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 12/250,149

(22) Filed: Oct. 13, 2008

(65) Prior Publication Data

US 2009/0039876 A1  Feb. 12, 2009

Related U.S. Application Data

(62) Division of application No. 11/752,751, filed on May 23, 2007, now Pat. No. 7,449,879, and a division of application No. 10/891,622, filed on Jul. 15, 2004, now Pat. No. 7,239,132, and a division of application No. 10/276,203, filed on Nov. 12, 2002, now Pat. No. 6,815,945.

(30) Foreign Application Priority Data

May 7, 2000  (DE)  .............................. 200 08 413 U
May 7, 2001  (EP)  ...................... PCT/EP01/05157

(51) Int. Cl.
*G01V 3/08* (2006.01)
*G01B 7/14* (2006.01)

(52) U.S. Cl. .............................. 324/207.24; 324/207.17
(58) Field of Classification Search ............ 324/207.24, 324/207.17, 207.26
See application file for complete search history.

(56) References Cited

U.S. PATENT DOCUMENTS 3,956,618 A * 5/1976 Gotz ........................... 702/150
5,001,425 A * 3/1991 Beling et al. ................. 324/239
5,666,050 A * 9/1997 Bouldin et al. .......... 324/207.26

* cited by examiner

*Primary Examiner*—Reena Aurora
(74) *Attorney, Agent, or Firm*—Conley Rose, P.C.

(57) ABSTRACT

The invention relates to a measuring device for detecting a body moving in relation to an, in particular, tubular container. Said device comprises at least one magnet unit which generates a magnetic field, measures this magnetic field and which is assigned to the container and/or to the magnetic body. The device also comprises at least one evaluation device connected to the magnet units and provided for receiving measurement signals of the magnet units. The aim of the invention is to improve a measuring device of this type in order to be able to easily determine, in addition to the position of the body in relation to the container in a longitudinal direction, the position of the body in relation to the container in the transverse direction with a relatively high level of accuracy. To this end, the magnet units comprise a maximum magnetic flux that is essentially perpendicular to the direction of the relative motion of the body and container.

15 Claims, 6 Drawing Sheets

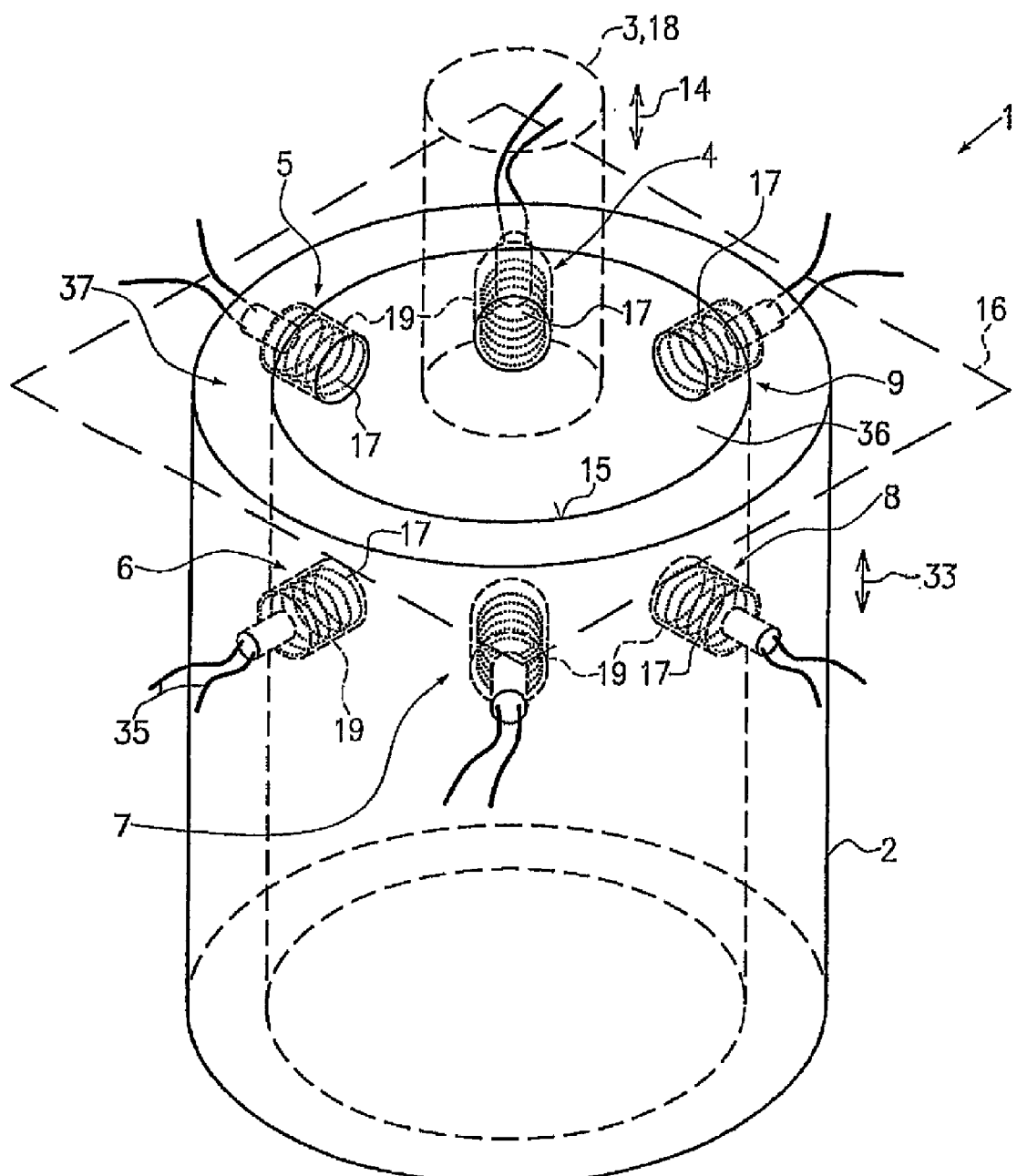
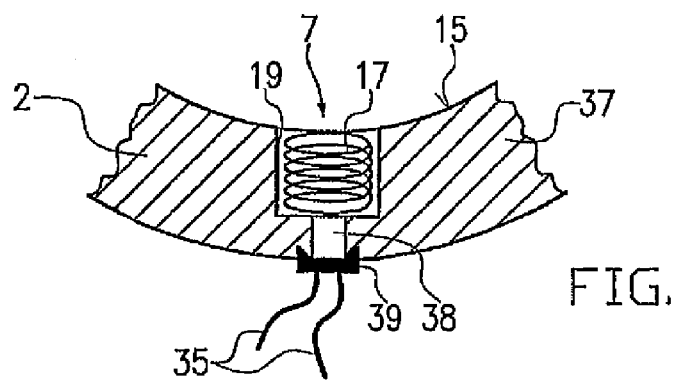
FIG. 1
FIG. 2

APPARATUS DETECTING RELATIVE BODY MOVEMENT

CROSS-REFERENCE TO RELATED APPLICATIONS

This application is a divisional of U.S. application Ser. No. 11/752,751, filed May 23, 2007, which is a divisional of U.S. application Ser. No. 10/891,622, filed Jul. 15, 2004, now U.S. Pat. No. 7,239,132, which is a divisional of Ser. No. 10/276,203, filed Nov. 12, 2002, now U.S. Pat. No. 6,815,945, and further claims a right of priority based upon PCT Application No. PCT/EP01/05157, filed 7 May 2001 and German Application No. 200 08 413.5 filed 7 May 2000, all of which are hereby incorporated herein by reference.

STATEMENT REGARDING FEDERALLY SPONSORED RESEARCH OR DEVELOPMENT

Not Applicable.

BACKGROUND OF THE INVENTION

This invention relates to a detection system for sensing an object in motion relative to a container, especially tubular in design, whereby at least one magnetic unit is associated with the container and/or object, generating as well as measuring magnetic fields, and at least one evaluation device is connected to the magnetic units and serves to receive sensing signals from the magnetic units.

A detection system of this type is described in U.S. Pat. No. 3,103,976. That particular detection system is used in locating pipes, and especially pipe ends to be joined, in underwater drilling and similar operations. A guide tube, serving as a container extending between a topside derrick and a frame section anchored on the sea bottom, is equipped on its outside with a coil as the magnetic unit generating a magnetic field and with each two search coils respectively mounted above and below the first coil and serving as the magnetic-field measuring magnets. Electric cables connect these various coils with a topside evaluation unit within the derrick. The magnetic-held-generating coil produces a magnetic field inside the guide tube essentially along the longitudinal axis of the tube. That magnetic field also permeates the two magnetic-field-measuring coils. If and when within the guide tube a drill rod, tool, pipe or the like is shifted, the magnetic field in these measuring coils will change as a function of the position of the moving object, leading to a corresponding induction in these coils. It is thus possible to determine when the object concerned has reached one of these magnetic-field-measuring coils or for instance the blowout valve located on the sea bottom.

That earlier detection system, however, is essentially limited to sensing the position only of the forward end of the moving object, with the positional detection accuracy being determined by its distance from the coils which are mounted along the longitudinal axis of the guide tube, by the coil width in the longitudinal direction, and similar factors.

BRIEF SUMMARY OF THE PREFERRED EMBODIMENTS

It is the objective of this invention to provide an improved detection system of the type first above mentioned, the improvement consisting in the ability, in simple fashion and with a relatively high degree of accuracy, to determine not only the position of the object relative to the container in the longitudinal direction but also its position in the transverse direction relative to the container.

In conjunction with the characteristic features specified within the main concept of the claims, this is accomplished in that the magnetic units produce a maximum magnetic flux essentially perpendicular to the direction of relative movement between the object and the container. This causes a change in the magnetic field and in the magnetic flux when the object is close enough to the container that both are located within the magnetic field of the magnetic-field-generating magnetic unit. At the same time, given this position of the object and the container relative to each other, there will be a change in the magnetic field in the direction perpendicular to the relative movement, thus yielding for the evaluation device additional information on the position of the object and the container perpendicular to the direction of relative movement.

According to this invention, the functionality of the detection system does not depend on whether the container, for instance tubular in design, is stationary while the object moves relative to it, or vice versa, for as long as at least the moving part contains a magnetic element which triggers a corresponding change in the magnetic field between the magnetic units.

In oil-drilling or similar operations, it may be advantageous in this context if in particular the tubular container constitutes the aforementioned guide tube and the object is the part that moves relative to that tube. The latter should consist of, or contain, a magnetic material at least at the point which is to serve for the detection of the position and orientation of the object relative to the container. That point could for instance be the forward end of the object.

An object of this type typically moves within the container so that the corresponding magnetic units can be advantageously mounted in an inside area of the container. On the other hand, if the moving object consists of a non-magnetic material while the container is provided with a magnetic element in an appropriate location, the corresponding magnetic units may equally well be mounted on an outside surface of the object. It is also possible, for facilitated access, to position the magnetic units on an outside surface of the container with the generated magnetic field extending through the wall and into the interior of the container.

In one possible, simple configuration for the precise capture of the moving object the magnetic units are arranged along at least one orientational plane perpendicular to the direction of relative movement. For example, multiple magnetic units may be arranged in a circular array or in some other way depending on the cross-sectional shape of the container, with the possibility of mounting the magnetic units, with equidistant spacing from one another, in the circumferential direction of the container.

So as not to limit the detection of the object to essentially one such plane, magnetic units may be mounted perpendicular to the direction of relative movement in evenly spaced planar increments. This permits capture in each of these staggered planes as well as detection between these planes by means of suitably interconnected magnetic units.

Depending on the design of the magnetic unit, it is possible for such a magnetic unit to be switchable between magnetic-field generation and magnetic-field sensing. This can take place even during the course of a measurement. Evidently, such switchability of the magnetic units involves variable polarity of the magnetic units, variable magnetic-field intensity or the like.

A simple design example of a magnetic-field-generating magnetic unit can be implemented in the form of a permanent magnet.

For an expanded range of possibilities in object detection per the above, a magnetic unit may be constituted of an electrically powered coil which provides a simple way to permit operation both for magnetic-field generation and magnetic-field measurement. A coil also allows for easy variation of the magnetic-field intensity or polarity and the generation of alternating fields.

A magnetic-field-measuring unit that is at once precise, simple and inexpensive may be in the form of a magnetic-field sensor and in particular a Hall element. Magnetic-field sensors of that type can be installed, in simple fashion and at low cost, in arrays of the desired density and configuration for instance on the inside of the container.

Of course, a suitably designed magnetic unit can also detect magnetic attenuation instead of measuring the magnetic field or magnetic flux.

For an amplification of the magnetic field and thus of the magnetic flux perpendicular to the direction of relative movement, the magnetic unit may incorporate a magnetizable material, for instance a ferromagnetic or paramagnetic material.

To avoid having to separately provide each magnetic unit with a magnetizable material, the magnetic units may be interconnected by a magnetizable or magnetically conductive material.

For a secure installation of the magnetic unit, the unit may be placed for instance in a radial bore in the container wall. The radial bore should be at least deep enough in the radial direction for the magnetic unit to be fully insertable without protruding into the interior of the container.

To avoid having to drill a corresponding number of radial bores or similar recesses in the container wall while at the same time being able to simultaneously manipulate a larger number of magnetic units, it is possible to mount multiple magnetic units in a magnetic-detector insert which may be mounted for instance in a circumferential recess on the inside of the container. This recess can again be deep enough to prevent the magnetic-detector insert with the magnetic units from protruding into the interior of the container.

Suitably designed magnetic units allow for the deployment in objects with a variety of cross sections. Of course, for oil exploration and similar applications it will be advantageous, and at the same time the data capture for the detection of the object within the container will be simplified, if the container and/or object are essentially tubular in design. In applications related to oil and gas exploration, it is an essentially tubular object that is guided within an equally more or less tubular container. The object can be so guided that it is either in contact with or moves at a distance from the inside wall of the container.

In another possible, simple and space-saving design, a magnetic unit may be provided with a ramified and/or continuous helical, electrically conductive ribbon. Such a ribbon essentially corresponds to a coil and generates a comparable magnetic field.

For the convenient manipulation of ribbon-shaped magnetic units of this type, the ribbon may be mounted on a preferably annular insert. The insert, of course, is shaped to correspond to the cross section of the container, permitting easy installation on an inside surface of the container.

The insert can allow for further simplification in that the necessary electrical power-supply and/or signal-collecting leads are attached to the ribbon-shaped magnetic units mounted in the insert.

In analogous fashion it is possible in the case of the aforementioned magnetic-detector insert employing electrical coils to provide the electric coils with winding stems as magnetic units. The coils are wound on these winding stems which, like the entire magnetic-detector insert, may consist of a magnetizable material.

The evaluation especially of the signals received by the magnetic-field-sensing magnetic units is possible not only for determining the position of the object. A suitably equipped evaluation device may include a memory module and/or a display unit or may be connectable to the latter or for instance to a computer. Stored in the memory module may be the necessary mathematical evaluation algorithms and/or address tags permitting the analysis of the measured signals. The display unit may be used, for example, for a graphic illustration of the object or for detecting the object.

The evaluation device may also be so configured that in addition to merely detecting the presence of the object it also permits the determination of the position, shape, size or direction of movement of the object.

The analysis of the signals emanating from the magnetic units and the very positioning of the magnetic units can be simplified for instance by aligning the magnetic axes of the magnetic units with a longitudinal axis of symmetry of the container.

BRIEF DESCRIPTION OF THE DRAWINGS

The following describes desirable design examples of this invention in more detail with the aid of the figures in the attached drawings in which:

FIG. 1 is a perspective side view of a first design example of a detection system according to this invention, employing a tubular container;

FIG. 2 is a top view of a horizontal section through FIG. 1;

DETAILED DESCRIPTION OF THE PREFERRED EMBODIMENTS

Figure 3:
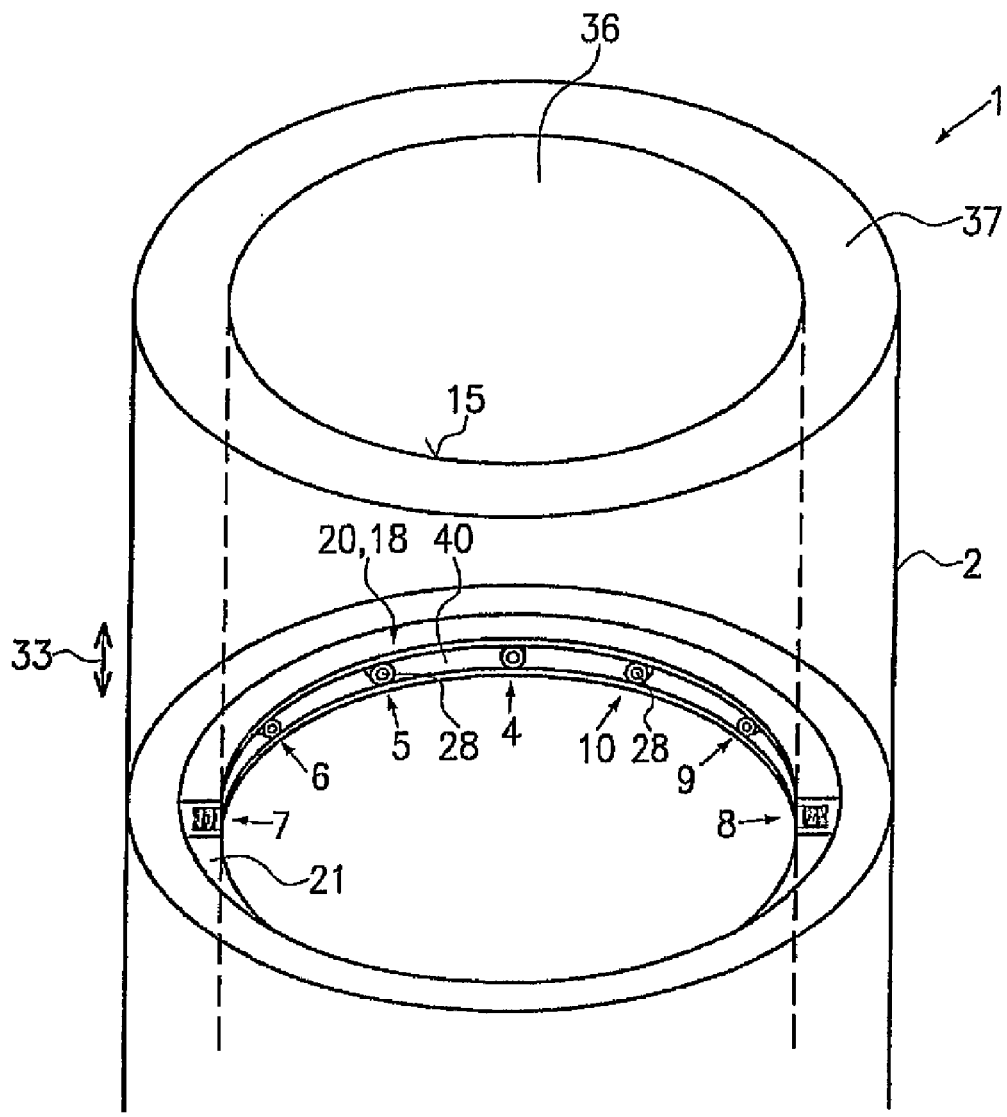
FIG. 3 is a perspective side view of a second design example of a detection system according to this invention.

FIG. 1 depicts a first design example of a detection system 1 according to this invention, with a tubular container 2 and a similarly tubular object 3. The container extends for instance from an ocean-surface platform, not shown, to a frame section anchored on the sea floor. Inside the container 2 the object 3 is guided in the longitudinal direction 33 i.e. in the direction of relative movement 14. The object may for instance be a section of a drill rod, a tool or similar implement employed in submarine oil exploration.

In an orientational plane 16 which extends perpendicular to the direction of relative movement 14, the container 2 accommodates a number of magnetic units 4 to 9. These are housed in corresponding radial bores of the container 2 and support at least one electric coil 17 each. The central axes of the coils 17 are positioned in the orientational plane 16 and point toward the center of the longitudinal bore 36. All magnetic units 4 to 9 are mounted in an equidistant relation to one another on the inside 15 along the internal circumference of the container 2. The coils 17 are positioned within the radial bore 19 so that the magnetic units 5 to 9 will not protrude past the inner surface 15 into the longitudinal bore 36.

Each coil 17 connects to the appropriate electrical leads 35 which extend outward away from the container 2 from where they are bundled in omnibus cables, not shown, and run for instance to a topside point.

At least magnetic unit 4 is a magnetic-field-generating magnetic unit. Its magnetic field is modified by the object 3 which at least in part consists of a magnetizable or magnetically conductive material 18, and the magnetic field, modified by the movement and changed position of the object 3 relative to the longitudinal bore 36, can be captured by the magnetic-field-sensing magnetic units 5 to 9. By way of their electrical leads 35, the magnetic units 5 to 9 thus generate a corresponding induced voltage as a function of the magnetic flux permeating them and changing with time.

Instead of arranging the magnetic-field-generating magnetic unit 4 and the corresponding magnetic-field-sensing magnetic units 5 to 9 in one single plane 16 per FIG. 1, it is also possible to position the magnetic-field-sensing magnetic units for instance partly or entirely in different orientational planes which are spaced at a distance from and offset upward and/or downward relative to the orientational plane 16 per FIG. 1.

FIG. 2 shows a horizontal section through FIG. 1 in the area of the orientational plane 16 and more specifically in the area where magnetic unit 7 is located. The radial bore 19 in a wall 37 of the container 2 opens toward the inside surface 15 while at its opposite end a wire duct 38 allows the electrical leads 35 to run from the coil 17 to the outside and away from the longitudinal bore 36. The wire duct 38 can be closed off with a cap 39 through which the leads 35 are passed via a water-tight seal.

The magnetic-field-generating magnetic unit 4 per FIG. 1 is configured in analogous fashion. It should be mentioned at this point that all magnetic units per FIG. 1 are capable of serving as magnetic-field-generating or magnetic-field-sensing magnetic units. For example, magnetic units 6, 7 and 8 may be used as the magnetic-field-sensing units and the magnetic units 4, 5 and 9 as the magnetic-field-generating units. Obviously, any arbitrary assignment of these magnetic units is possible both before and during a given detection process.

FIG. 3 is a perspective view, corresponding to FIG. 1, of a second design example of the detection system 1 according to this invention. In this figure and in the figures that follow as well as in FIGS. 1 and 2, identical components bear identical reference numbers which will be mentioned only occasionally.

FIG. 3 differs from FIG. 1 by the consolidation of the magnetic units 4 to 10 in one magnetic detection insert 20 consisting of a magnetizable or magnetically conductive material 18. The magnetic detection insert 20 is suitably mounted in a circumferential recess 21 on the inside 15 of the wall 37 of the container 2. The magnetic detection insert 20 has an essentially U-shaped cross section. The open end of the U-profile faces inward in the direction of the longitudinal bore 36. Located at given points in the annular gap 40 between the legs of the U-profile is a winding stem 28 consisting of a magnetizable material and radially extending parallel with the U-legs toward the inside in the direction of the longitudinal bore 36. Wound onto each such winding stem 28 is a coil 17 of the respective magnetic unit 4 to 10. These magnetic units, i.e. coils, are arranged in one orientational plane 16 analogous to FIG. 1. It should be pointed out again that similar magnetic detection inserts can be mounted in more than one orientational plane.

Figure 4:
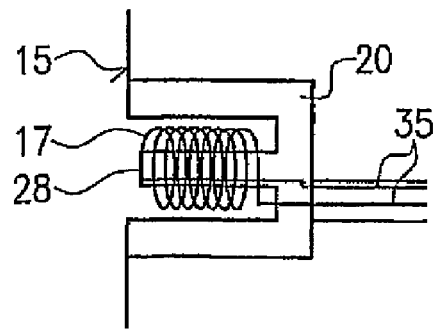
FIG. 4 shows a partial vertical section through FIG. 3.

FIG. 4 shows a partial vertical section through the design example per FIG. 3. It clearly illustrates that the coil 17 is wound on the winding stem 28 and that the associated electrical leads 35 of the coil 17 run through a hole in the wall 37 to the outside in a radial direction relative to the container 2. As has been explained in connection with FIG. 1, the various magnetic units 4 to 10 may be optionally set to operate as magnetic-field-generating or magnetic-field-sensing units.

Figure 5:
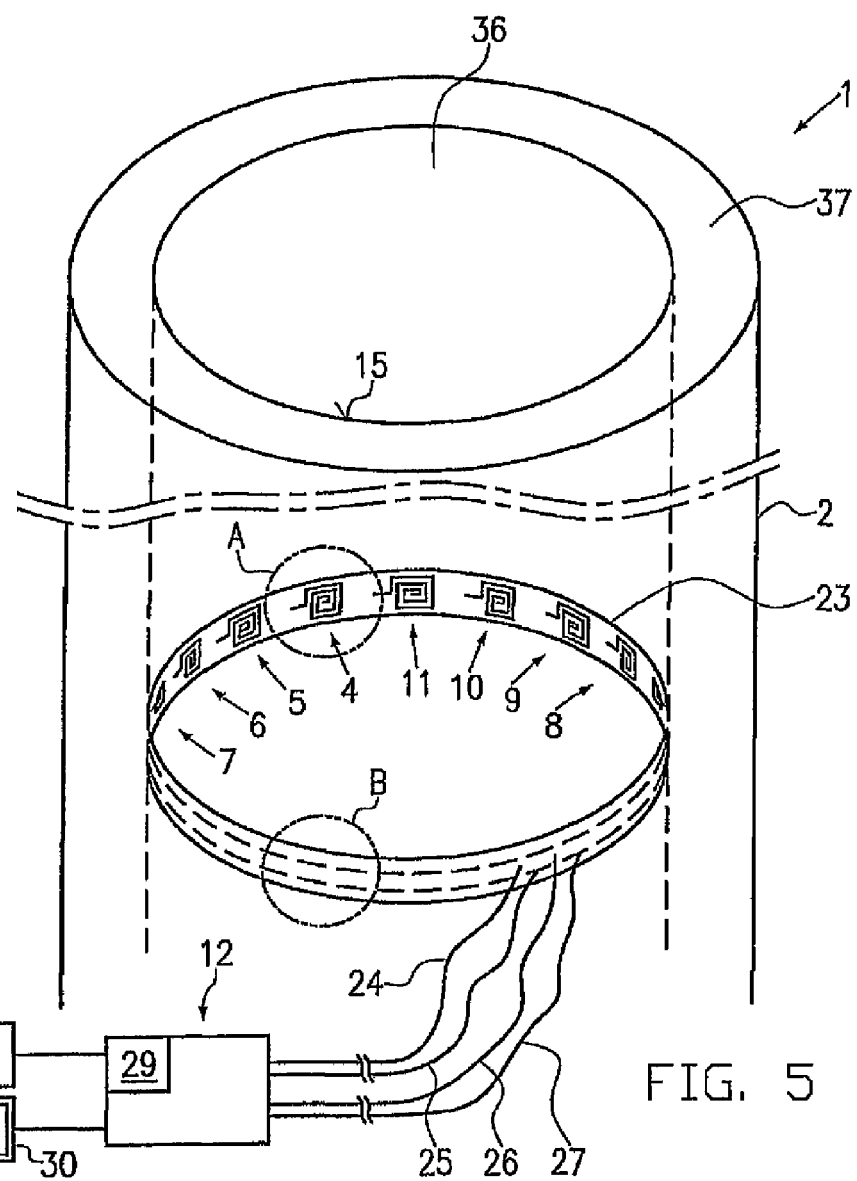
FIG. 5 is a perspective side view of a third design example of a detection system according to this invention.

FIG. 5 is a perspective view, analogous to FIGS. 1 and 3, of a third design example of the detection system according to this invention.

Figure 6:
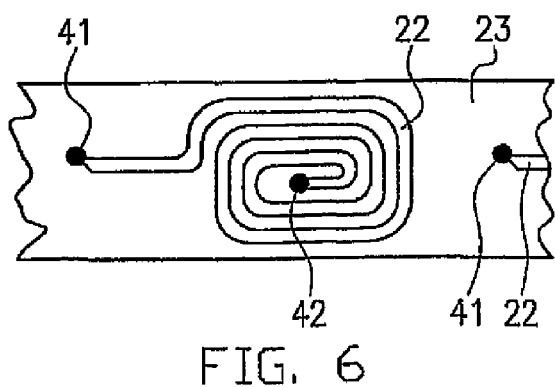
FIG. 6 is an enlarged illustration of detail "A" in FIG. 5.
Figure 7:
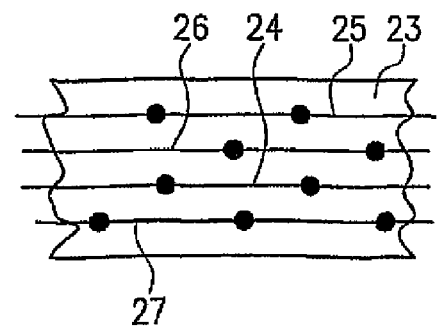
FIG. 7 is an enlarged illustration of detail "B" in FIG. 5.

In this design example, the magnetic units 4 to 11 are in the form of ribbons 22 applied on an insert 23 by a thin-film or similar technology process. The ribbons extend in a ramified and/or helical configuration. Each ribbon is provided at one end with an electrical connector 41 and at the other end with a corresponding electrical connector 42 for supplying power or collecting sensing signals. On the outside of the insert 23 opposite the longitudinal bore 36 the contacts 41, 42 are connected, for instance as shown in FIG. 6, to electrical power supply lines 24, 25 or electrical signal-processing lines 26, 27. These electrical lines 24, 25 and 26, 27, for instance as shown in FIG. 7, can be switched to serve either as power-supply or signal-processing lines, thus affording the option of using the magnetic units.

The insert 23 consists of a thin ring of a magnetizable material which allows easy mounting on the inside wall 15 of the container 2 in essentially any desired location. Similar inserts 23 can be mounted in different orientational planes as described in connection with FIGS. 1 and 3.

At one point the insert 23, by way of its leads 24 to 27, is connected to an evaluation device 12 which in the case of submarine oil exploration is typically located in a suitable place on a surface platform. For other applications of the detection system according to this invention, such as land-based oil exploration, the evaluation device 12 will be set up in a conveniently accessible location.

In the design example per FIG. 5, the evaluation device 12 incorporates for instance a memory module 29 for saving the incoming sensing signals or for storing appropriate programs for the analysis of these sensing signals. The sensing signals, processed as necessary, can be viewed on a display monitor 30 connected to the evaluation device 12. The evaluation device 12 may be computerized or connected to a remote computer 31 which may also allow the evaluation device to be programmed for instance to switch the magnetic units into the magnetic-field-generating or, respectively, magnetic-field-sensing mode.

At this juncture it should be mentioned that the magnetic-field-generating magnetic units may also be in the form of permanent magnets, for one example. The magnetic-field-sensing magnetic units on their part may be in the form of magnetic sensors such as Hall elements.

The evaluation device 12 also offers the possibility to change the polarity or field intensity of the magnetic field generated. Alternating magnetic fields can also be produced.

FIGS. 8 to 12 are conceptual illustrations of the detection system 1 according to this invention, showing different magnetic units 4 to 11 without an object 3 (FIG. 8) and, respectively, with different objects in different positions within the container 2.

Figure 8:
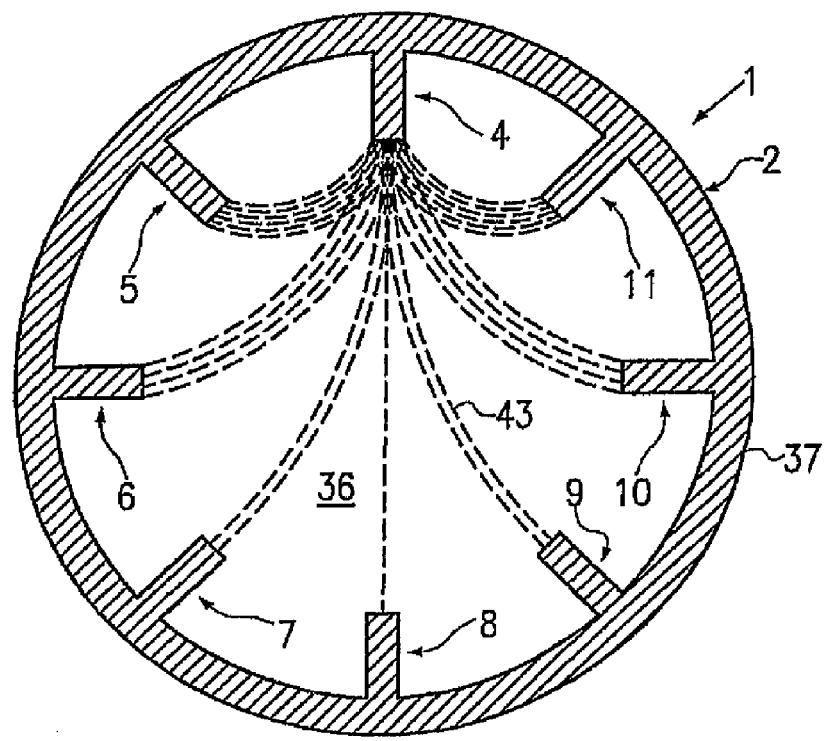
FIG. 8 is a conceptual illustration of a horizontal cross section through a detection system according to this invention.

FIG. 8 shows the magnetic field generated by the magnetic unit 4, unaffected, as in Figure 1, by any object 3. The corresponding magnetic-field flux lines 43 extend perpendicular to the longitudinal bore 36 and flow to the respective magnetic-field-sensing magnetic units 5 to 11. The distance of the magnetic-field-sensing magnetic units 5 to 11 from the magnetic-field-generating magnetic unit 4 determines the extent to which the flux lines permeate the magnetic units. The magnetic flux itself varies accordingly.

Figure 9:
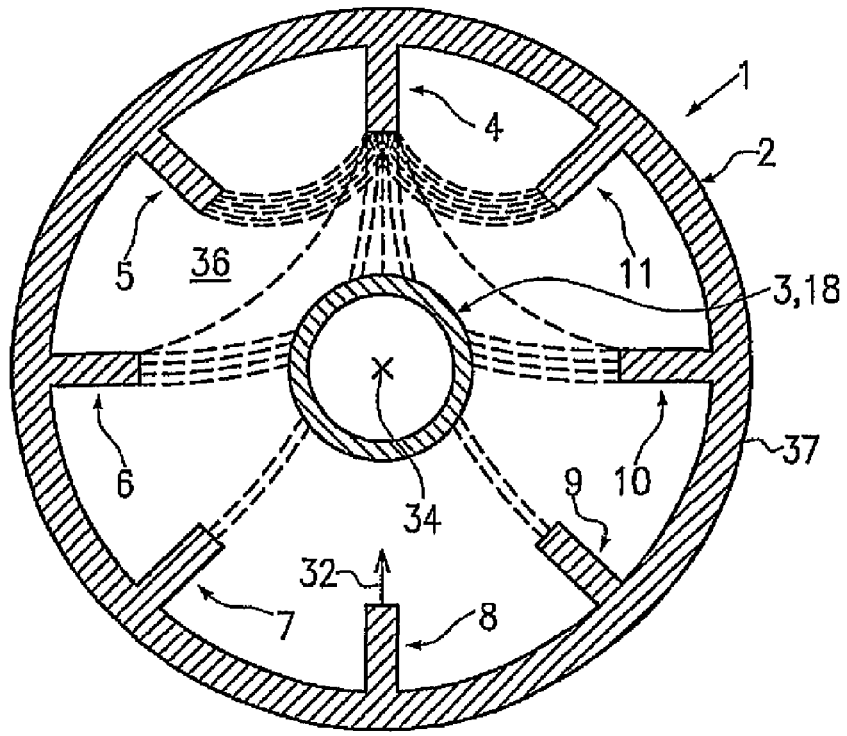
FIG. 9 is an illustration as in FIG. 8 with an object in central position.

The magnetic units 4 to 11 are arranged in a way that they, and in particular their respective magnetic axes 32 as shown for instance in FIG. 9, are oriented toward a central point 34 in the longitudinal bore 36, i.e. toward an axis of symmetry 34 which extends in the longitudinal direction 33 per FIG. 1.

Figure 10:
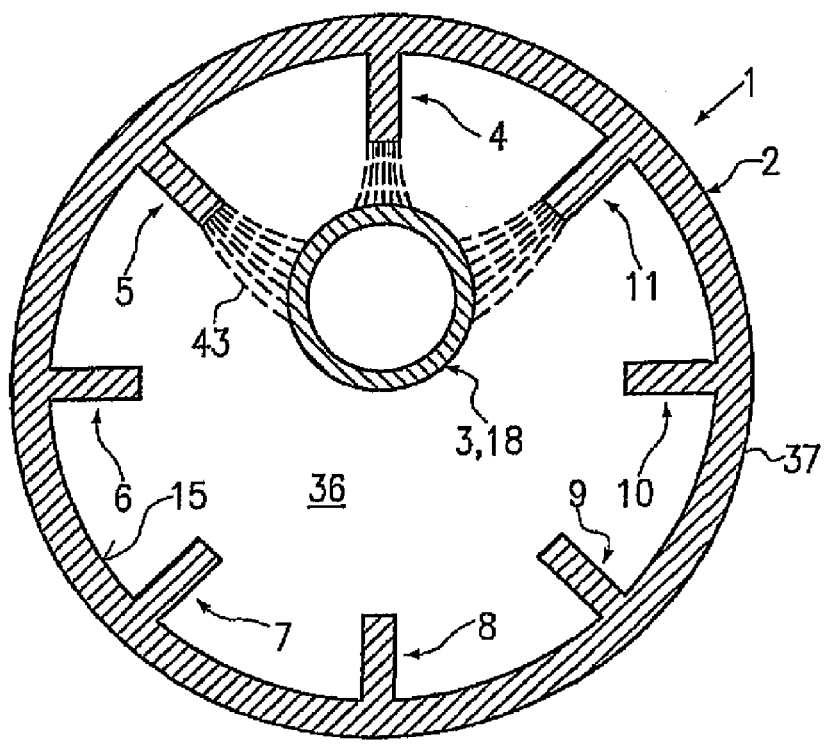
FIG. 10 is an illustration as in FIG. 8 with an object in an off-center position.
Figure 11:
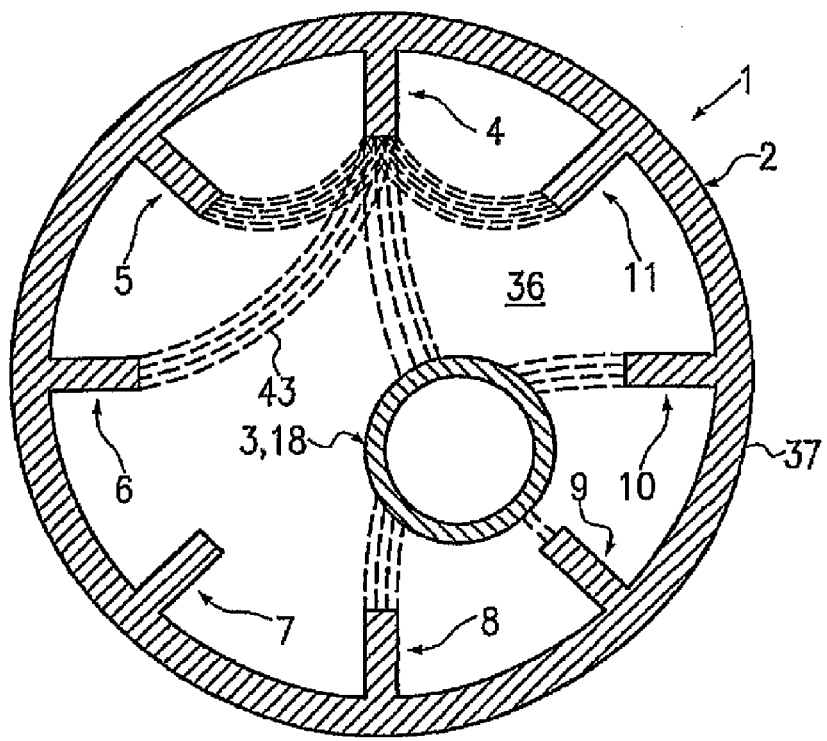
FIG. 11 is an illustration as in FIG. 8 with an object in another off-center position.

When an object 3 moves relative to the container 2, the result will be a change in the path of the magnetic flux lines, as shown in FIGS. 9 to 11. In FIG. 9 the object 3 is positioned at dead center 34, causing a correspondingly symmetrical flux-line distribution pattern. In FIG. 10, the object is situated off-center and close to the magnetic-field-generating magnetic unit 4.

In FIG. 11, the object 3 is again in an off-center position, in this case close to the magnetic-field-sensing magnetic unit 9.

From the respective changes in the magnetic fields and the magnetic flux, detectable by the magnetic-field or magnetic-flux-sensing units 5 to 11, conclusions can be drawn as to the presence of the object 3 in the vicinity of the magnetic unit as well as the distance between the object 3 and the individual magnetic units, the orientation and dimensions of the object 3 and its direction of movement. By means of appropriate imaging processes in the evaluation device 12, for instance as shown in FIG. 5, it is possible to view on the display monitor 30 the object 3, its position, orientation, size and movement.

Figure 12:
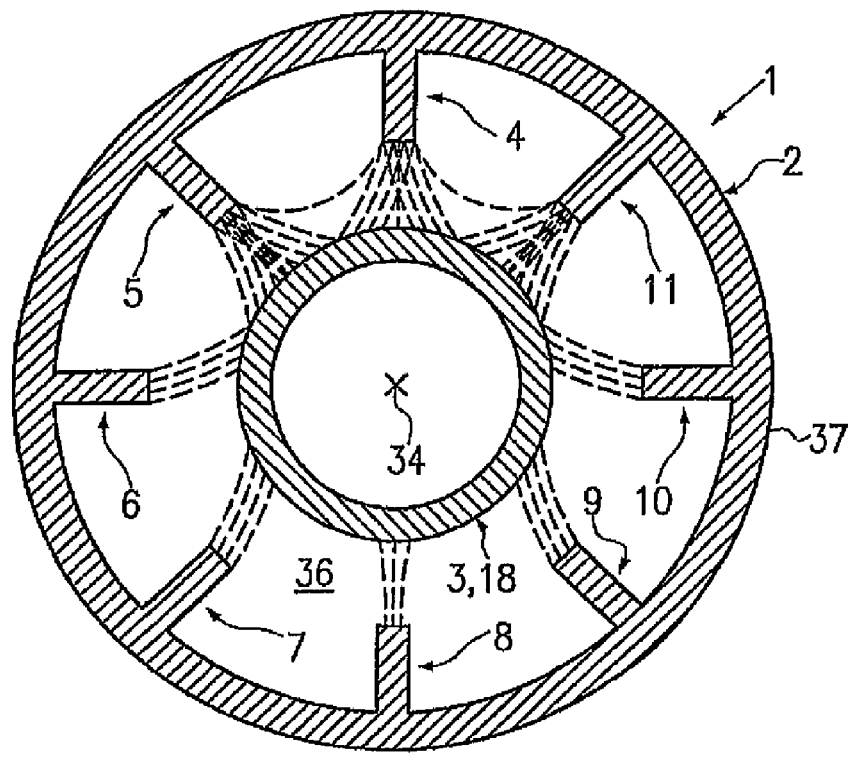
FIG. 12 is an illustration as in FIG. 8 with an object in another central position.

FIG. 12 shows an object 3 larger in overall dimensions and wall thickness, with corresponding changes in the magnetic field and magnetic flux pattern. FIG. 12 thus shows what other conclusions are possible in terms of the dimensions of the object 3.

Figure 13:
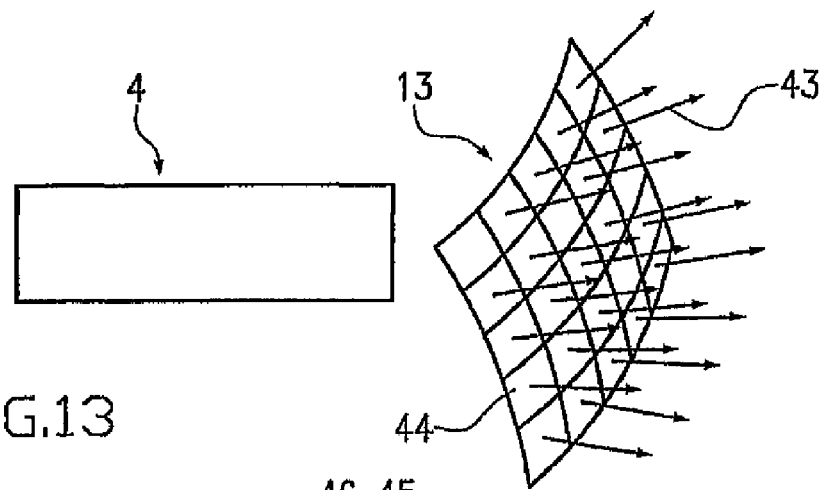
FIG. 13 is a conceptual illustration explaining the magnetic flux.

FIG. 13 is a simplified representation of a magnetic-field-generating magnetic unit 4, the magnetic field and flux line 43 generated by it, and the respective magnetic flux 13 through different area-array elements 44. Traditionally, the magnetic flux is determined by the following equation:

$$\phi = \int_A B \, dA$$

where $\phi$ is the magnetic flux, B is the magnetic induction and dA is an infinitesimal vectorial area-array element. According to the invention, the magnetic units 4 to 11 are so arranged that the respective magnetic flux displays its maximum value perpendicular to the relative movement between the object and the container, meaning that the scalar product derived from magnetic induction and the vectorial area-array element takes on its maximum value for the respective area-array elements per FIG. 13.

Figure 14:
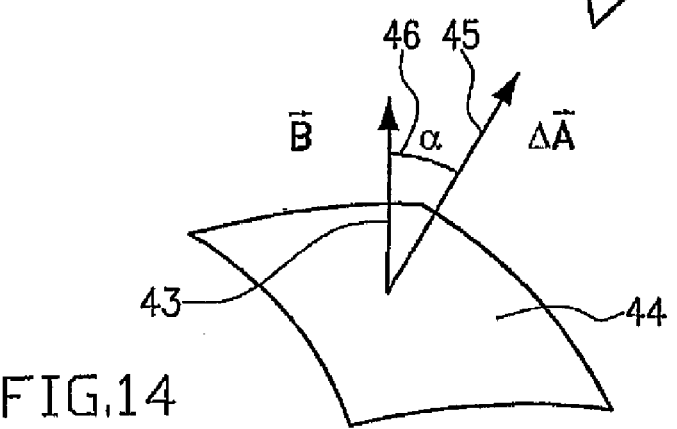
FIG. 14 shows in detail an area-array element per FIG. 13.

FIG. 14 is a conceptual illustration showing that for each area-array element 44 the magnetic flux derives from the scalar product of magnetic induction B und $\Delta A$ as the vectorial area-array element. The applicable equation is a follows:

$$\phi = |B| \times |\Delta A| \times \cos \alpha$$

where $\alpha$ is the corresponding angle 46 between the vectors B and $\Delta A$.

The following will briefly explain the operating mode of the detection system according to this invention with reference to the attached drawings.

By way of the magnetic flux and/or the magnetic attenuation, the detection system according to this invention measures any given object of any given shape, orientation, position and geometry within a magnetic field generated inside a container 2. One or several magnetic units serve to generate the magnetic field and the corresponding magnetic flux. One or several additional magnetic units capture the magnetic flux that has been modified by the object and its movement or location and on the basis of the sensing signals received it is possible to determine the distance between the object and these magnetic units as well as the position, size and direction of movement of the object. The magnetic-flux-based measurement can take place in static and/or dynamic fashion through alternating fields, variable field intensity and variable polarity.

The magnetic-field-generating magnetic units may be in the-form for instance of a permanent magnet or electrically powered and controlled coil. The magnetic-field-sensing magnetic units can measure the magnetic flux produced in static fashion employing Hall elements and/or in dynamic fashion by way of electromagnetic induction. The configuration and the number of the magnetic-field-generating and magnetic-field-sensing magnetic units are variable, and especially when coils are used as the magnetic units a switchover between the magnetic-field-generating and the magnetic-field-sensing mode of the magnetic units is easily accomplished.

The sensing signals are evaluated using mathematical operations and/or address tags and it is possible to display them in graphic form on a display monitor per FIG. 5, showing the shape and position of the object under analysis.

The magnetic units can be arranged in a circular or other configuration in one or several planes and they are typically interconnected via a magnetically conductive or magnetizable material. The multiplicity of the different magnetic units and their utilization for generating or sensing and measuring magnetic fields produce magnetic flux patterns between all associated magnetic units which patterns, and any changes thereof, are used for the imaging and positional determination of the object to be measured. The varying magnetic flux is analyzed by appropriate metrics for a determination of the size, shape and position of drill pipes including their tool joints and any associated tools. It is also possible to detect the direction when the pipes or tools constituting the objects within the tubular container are moved. The magnetic units can further recognize drill pipes which are in contact with one of the inside walls of the container, causing the dreaded friction-induced wash-out of the equipment.

The invention claimed is:

1. A system, comprising:
   a container;
   an object that moves within the container; and
   a magnetic-based position detection system that is configured to determine a longitudinal position of the object relative to the container and a transverse position of the object relative to the container based on a plurality of magnetic units circumferentially integrated with the container.

2. The system of claim 1 wherein the container comprises a tubular structure that extends from an ocean-surface platform to a sub-sea location.

3. The system of claim 1 wherein the object comprises an oil exploration tool that moves within the tube.

4. The system of claim 1 wherein the magnetic-based position detection system comprises an evaluation unit coupled to a plurality of magnetic units comprising at least one magnetic field generating unit and a plurality of magnetic field measuring units.

5. The system of claim 4 wherein the at least one magnetic unit is positioned on the object and the plurality of magnetic field measuring units are positioned on an inside area of the container.

6. The system of claim 4 wherein the at least one magnetic unit and the plurality of magnetic field measuring units are positioned on an inside area of the container.

7. The system of claim 4 wherein, to determine said longitudinal position and said transverse position, the evaluation unit selectively causes at least one of the magnetic units to switch between a magnetic field generating mode and a magnetic field measuring mode.

8. The system of claim 4 wherein, to determine said longitudinal position and said transverse position, the evaluation unit selectively controls a polarity of at least one of the magnetic units.

9. The system of claim 4 wherein, to determine said longitudinal position and said transverse position, the evaluation unit selectively controls a magnetic-field intensity of at least one of the magnetic units.

10. The system of claim 4 wherein, to determine said longitudinal position and said transverse position, the evaluation unit selectively alternates a magnetic field produced by at least one of the magnetic units.

11. The system of claim 4 wherein the evaluation unit causes the longitudinal position and the transverse position to be displayed on a monitor.

12. The system of claim 4 wherein, to determine the transverse position, the evaluation unit receives magnetic flux measurements from the plurality of magnetic field measuring units and correlates the received magnetic flex measurements with the transverse position.

13. The system of claim 1 wherein the magnetic-based position detection system comprises an evaluation unit coupled to a plurality of magnetic units arranged in a single plane around an internal circumference of the container.

14. The system of claim 1 wherein the magnetic-based position detection system comprises an evaluation unit coupled to a plurality of magnetic units arranged in multiple planes around an internal circumference of the container.

15. The system of claim 1 wherein the magnetic-based position detection system comprises an evaluation unit coupled to a plurality of magnetic units, wherein the evaluation unit selectively provides power to and receives measurements from at least one of the magnetic units.

* * * * *